H. C. HART.
Bit-Stock.
No. 204,727. Patented June 11, 1878.
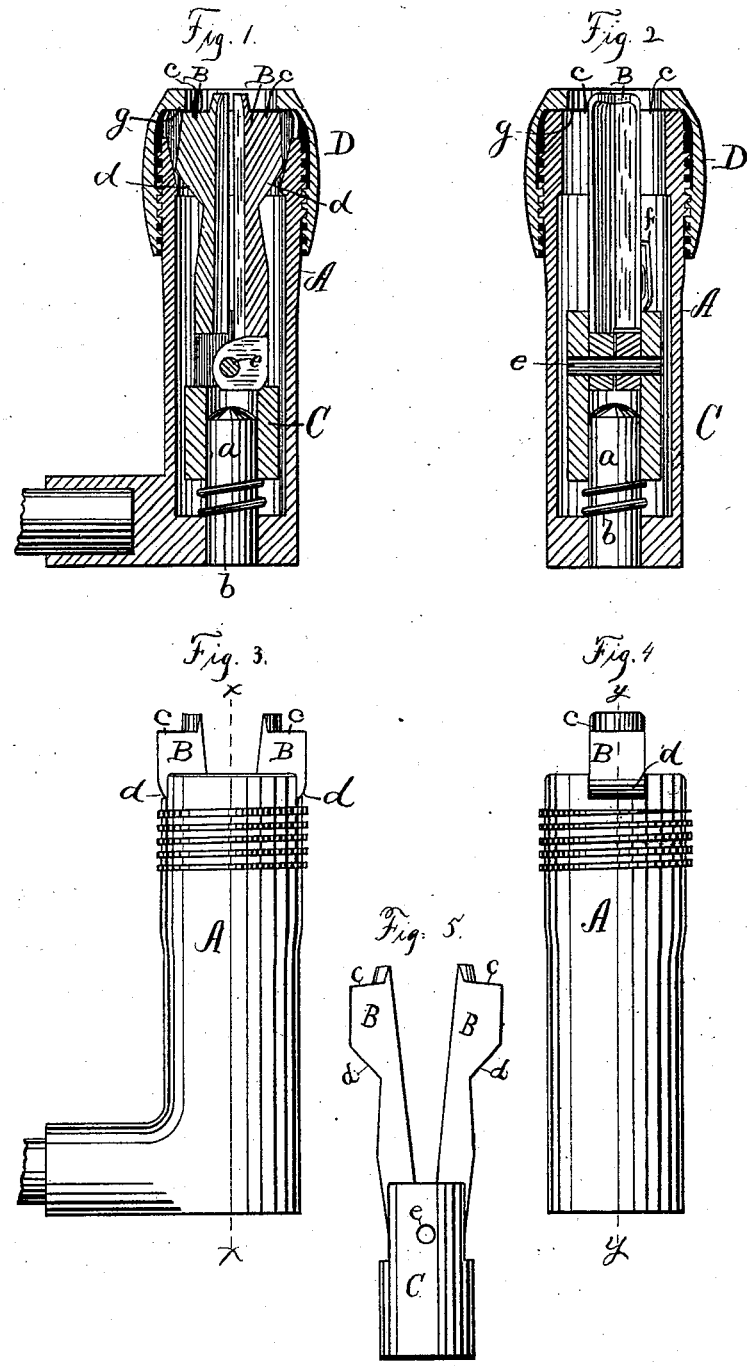
Witnesses.
W. B. Thomson
F. L. Hungerford
Inventor.
Hubert C. Hart
By James Shepard Atty.

UNITED STATES PATENT OFFICE.

HUBERT C. HART, OF UNIONVILLE, ASSIGNOR OF ONE-HALF HIS RIGHT TO P. & F. CORBIN, OF NEW BRITAIN, CONNECTICUT.

IMPROVEMENT IN BIT-STOCKS.

Specification forming part of Letters Patent No. 204,727, dated June 11, 1878; application filed October 26, 1877.

*To all whom it may concern:*

Be it known that I, HUBERT C. HART, of Unionville, in the county of Hartford and State of Connecticut, have invented certain new and useful Improvements in Bit-Braces, of which the following is a specification:

My invention consists in the peculiar shape of the jaws and screw-thimble, and in the manner of and mechanism for governing the lower end of the jaws, all as hereinafter described.

In the accompanying drawings, Figure 1 is a longitudinal section of a bit-brace which embodies my invention, the plane of section being indicated by line $x\,x$ in Fig. 3. Fig. 2 is a longitudinal section of the same on line $y\,y$ of Fig. 4, and Figs. 3 and 4 are side elevations of the same with the screw-thimble removed; and Fig. 5 is a side elevation of the jaws and the sliding block.

A designates the socket, which is a hollow cylindrical shell, screw-threaded on its periphery at its upper end, which end, for a short distance, is slotted transversely, as shown in Figs. 3 and 4. At the extreme upper end these slots extend wholly through the walls of the socket, and from the periphery they extend downward, at the same time inclining inward on about the same angle of inclination as the inclined surface $d$ on the jaws, as shown in Fig. 1. This socket and its adjacent parts constitute the head of the bit-brace, and may be attached to the crank of the brace in any proper manner. In the foot of the socket A is a stationary central pin, $a$, extending up a short distance on the axial line of the socket, as shown in Figs. 1 and 2, and surrounding said pin is a spiral spring, $b$.

B B designate the jaws, having a flat-faced shoulder, $c$, near their outer end, which shoulders stand at about right angles to the length of the jaws. Below the shoulders some little distance is an inclined surface, $d$, on the outer edge of the jaw, the incline beginning at said outer edge and slanting downward and inward. The inner face of the jaws is of an ordinary form. The lower ends of the jaws are hung on a pin, $e$, in the upper end of the sliding block C, having a central bore which fits the pin $a$ in the bottom of the socket, whereby the pin centers and governs the block C, which carries the jaws.

The thickness of the jaws at their upper end is such as to fill loosely the slots in the upper end of the socket, as shown in Fig. 4. A spring, $f$, Fig. 2, is placed on the side of the jaws to force them open. The screw thimble or nut D is threaded internally to fit the thread of the socket A, and at its upper contracted end has a flat seat, $g$, at about right angles to its axis, and its periphery is knurled as in ordinary bit-braces, for convenience of hand manipulation.

By turning the screw nut or thimble D upward the spring $b$ forces up the sliding block and jaws, causing them to follow the screw-thimble, and the spring forces the jaws outward until their outer edge at the upper end bears against the inner walls of the screw-thimble, when the jaws are fully opened, substantially as shown in Fig. 3, when the thimble is removed.

When the jaws are thus opened the shank of a bit or analogous tool is placed between them, the screw-thimble turned downward, when the flat right-angular seat $g$ engages the flat shoulders $c\,c$ and forces the jaws downward; but, inasmuch as these shoulders and seat are at right angles to the axis of the socket, the endwise pressure has no tendency of itself to force the jaws together, but its whole force is expended in forcing the jaws and sliding block downward on the centering-pin $a$. The inclined surface $d$ of the jaws is forced by this endwise motion against the walls of the socket at the bottom of the slots in said socket, which walls and incline force the jaws together firmly upon the shank of the bit, the downward movement of the jaws being stopped so soon as they firmly gripe the object placed between them, from which it will be seen that they will be forced downward more or less, dependent upon the size of the object which they grasp. In Figs. 1 and 2 the parts are represented with the jaws forced inward and downward to their utmost capacity.

The socket A may be cast hollow on a core, which leaves a rough inner surface; but the stationary pin $a$ may be made smooth before insertion and the central hole in the sliding block bored out smooth, so that the block may slide freely, although the inner walls of the socket are rough and uneven.

I claim as my invention—

1. In a bit-holder, the jaws B B, having the flat-faced shoulders c near their upper ends, and the downward and inward inclined surface d below said shoulders, said jaws adapted for use in connection with a hollow and slotted socket, and a screw-thimble having a flat right-angular seat for forcing the jaws endwise down into the socket, substantially as described, and for the purpose specified.

2. In a bit-holder, the screw thimble or nut having the flat right-angular seat surrounding all sides of the opening at the inside of its upper end, in combination with jaws adapted to be acted upon by said flat seat to force them endwise, substantially as described, and for the purpose specified.

3. In a bit-holder, the cylindrical stationary pin a, secured in the foot of the socket and in axial line therewith, in combination with the sliding block which carries the jaws, substantially as described, and for the purpose specified.

HUBERT C. HART.

Witnesses:
WALES S. PORTER,
HENRY H. CARRINGTON.